(12) United States Patent
Lee

(10) Patent No.: US 6,619,192 B2
(45) Date of Patent: Sep. 16, 2003

(54) FRYING PAN

(76) Inventor: Hyun-Sam Lee, 106-1602 Daewoo Apartment, Keoje2-dong, Yeonje-ku, Pusan 611-755 (KR)

( * ) Notice: Subject to any disclaimer, the term of this patent is extended or adjusted under 35 U.S.C. 154(b) by 0 days.

(21) Appl. No.: 09/862,435

(22) Filed: May 23, 2001

(65) Prior Publication Data

US 2002/0011154 A1 Jan. 31, 2002

(30) Foreign Application Priority Data

| Nov. 20, 2000 | (KR) | ................................ 2000-0069097 |
| Jul. 14, 2000 | (KR) | ................................ 2000-0020220 |
| Jul. 14, 2000 | (KR) | ................................ 2000-0040470 |
| Jun. 3, 2000 | (KR) | ................................ 2000-0015849 |

(51) Int. Cl.[7] ............................................. A47J 37/10
(52) U.S. Cl. ...................... 99/422; 99/426; 220/573.1; 220/4.223; 220/4.24; 220/849
(58) Field of Search ........................ 99/422, 425, 426, 99/403; 220/4.22, 4.24, 4.23, 573.1, 912, 232, 849

(56) References Cited

U.S. PATENT DOCUMENTS

| 2,061,610 A | * | 11/1936 | Burnette | ...................... 99/425 |
| 2,177,487 A | * | 10/1939 | Howlett | ...................... 99/426 |
| 2,722,173 A | * | 11/1955 | Cunningham | ................ 99/426 |
| 3,007,595 A | * | 11/1961 | Remley | ...................... 99/426 |
| 3,976,218 A | * | 8/1976 | Stoermer | .................. 99/403 X |

* cited by examiner

*Primary Examiner*—Reginald L. Alexander

(57) ABSTRACT

A frying pan, which has a double-sealed structure and is designed for controlling internal pressure and moisture, has first and second containers, which are combined each other at one ends and have a handle mounted at the other ends, and also includes a concave groove formed on a contact surface of any of the first and second containers, and a packing mounted in the concave groove.

6 Claims, 6 Drawing Sheets

FRYING PAN

BACKGROUND OF THE INVENTION

1. Technical Field

The present invention relates to a frying pan, and more particularly to a frying pan, which includes a packing installed on a contact surface between first and second containers having a heat surface respectively, and a control unit for controlling internal pressure and moisture.

2. Description of the Prior Art

A roasting device, generally called as a frying pan, has an open top used to roast fishes or meat such as a fresh fish or raw meat (hereinafter, referred as meat). When cooking meat with such a roasting device, liquid such as fat or water drop gets spattered out of the open top or spreads out indoors. Such fat or water drops may cause a dirty kitchen and an odor impregnated as well as low thermal efficiency. In particular, this spattering of fat or water drops makes moisture of a fish dispersed outside. Due to dispersion of the moisture, nutritious substances are destroyed, and the inside fresh of the roasted fish is not soft and gets dried fast as the time goes.

To prevent such problems, a cover such as a lid is used. However, the cover should be open for the purpose of turning over the meat, which also causes same problems.

In order to solve the above problems, there has been proposed a roasting device, when may roast meat in a closed state without turning over the meat, as shown in FIGS. 1 and 2.

FIG. 1 is a perspective view showing a conventional frying pan in an open state and FIG. 2 is a section view showing the frying pan of FIG. 2 in a closed state. Referring to FIGS. 1 and 2, the conventional frying pan includes a first container 1a, a second container 1b, a pivot pin 5 connecting the first and second containers 1a, 1b, and handles 3a, 3b mounted to the first and second container 1a, 1b, respectively.

In such a configuration, the first container 1a has a base 8a and a sidewall 9a perpendicular to the base 8a to form a first space 7a. An edge of the first space 7a has a round portion 11a. The second container 1b has a base 8b and a sidewall 9b perpendicular to the base 8b to form a second space 7b, similar to the first container 1a. An edge of the second space 7b also has a round portion 11b. Also, a bottom surface 15a of the base 8a or a bottom surface 15b of the base 8b is in contact with a heat source, both of which can be used at once.

The first and second containers 1a, 1b constructed as above have a sealed structure, in which a contact surface 13a formed at an upper portion of the sidewall 9a and a contact surface 13b formed at an upper portion of the sidewall 9b are shut tightly.

The pivot pin 5 connects hinges 17a, 17b formed at the first and second containers 1a, 1b and pivots for opening of the first container 1a or the second container 1b. At the hinge 17a or 17b, a stopper 19 is formed to maintain a rotation angle of the opened first or second container 1a, 1b within a range of 90° or 180°.

However, such a conventional frying pan has problems as follows.

First, because the contact surface 13a of the first container 1a and the contact surface 13b of the second container 1b are configured to come in touch, internal excessive pressure is discharged through all area between the contact surfaces 13a, 13b, so lowering the internal pressure. Therefore, an area used for discharging is so enlarged that more internal moisture may be extracted than required. Therefore, meat cooked in the frying pan does not contain sufficient moisture. In addition, sudden discharge of the pressure causes heat loss, which may lower heat efficiency.

Second, because of the round portion 11a or 11b formed at the first space 7a or the second space 7b, liquid in the first or second space 7a or 7b may flow down when the first or second container 7a or 7b is opened. Such liquid may fall down on a kitchen floor through a side edge near the hinge 17a or 17b without being collected.

SUMMARY OF THE INVENTION

The present invention is designed to solve the above problems of the prior art. An object of the present invention is to provide a frying pan, which may uniformly disperse heat applied to meat and make sufficient moisture contained in the meat for the purpose of economizing on electric power, softening the meat and extending a term of preservation of the roasted meat.

In order to accomplish the above object, the present invention provides a frying pan having first and second containers, which are combined each other at one ends and have a handle mounted at the other ends, includes a concave groove formed on a contact surface of any of the first and second containers; and a packing mounted in the concave groove.

The frying pan may also includes a control unit for controlling internal pressure and moisture in the first and second containers, the control means being mounted at any of the first and second containers.

The control unit can be either a hole formed at a sidewall of any of the first and second containers or a groove formed on a contact surface opposite to the contact surface where the concave groove is formed.

Preferably, a protruded rim is formed on a contact surface opposite to the contact surface where the concave groove is formed.

Also, a liquid collecting portion may be formed on any of the first and second containers.

BRIEF DESCRIPTION OF THE DRAWINGS

These and other features, aspects, and advantages of the present invention will become better understood with regard to the following description, appended claims, and accompanying drawings, in which like components are referred to by like reference numerals. In the drawings:

DETAILED DESCRIPTION OF THE PREFERRED EMBODIMENT

Figure 1:
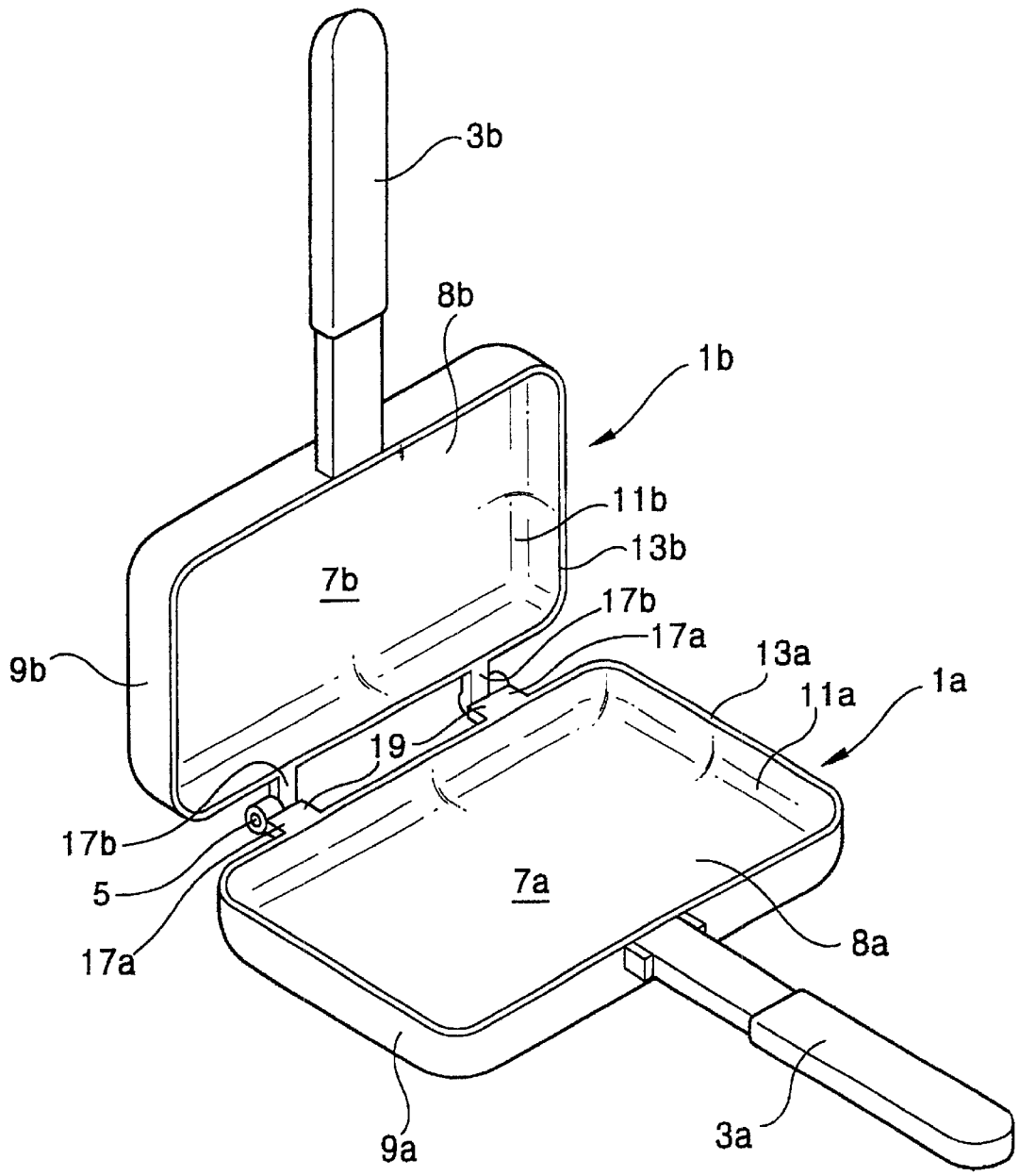
FIG. 1 is a perspective view showing a frying pan in an open state according to the prior art.
Figure 2:
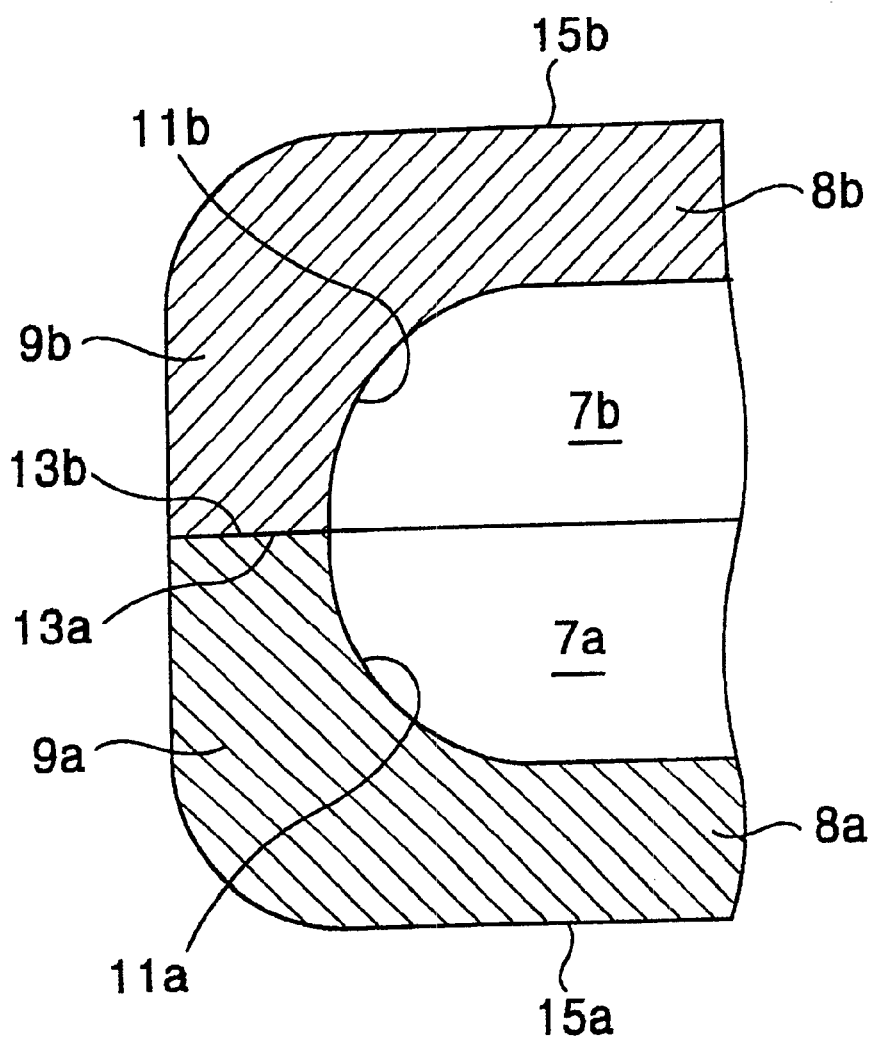
FIG. 2 is a section view showing the frying pan of FIG. 1 in a closed state.

Hereinafter, preferred embodiments of the present invention will be described in detail with reference to the accompanying drawings, in which same element as the prior art is designated with same reference numeral and not described in detail.

Embodiment 1

Figure 3:
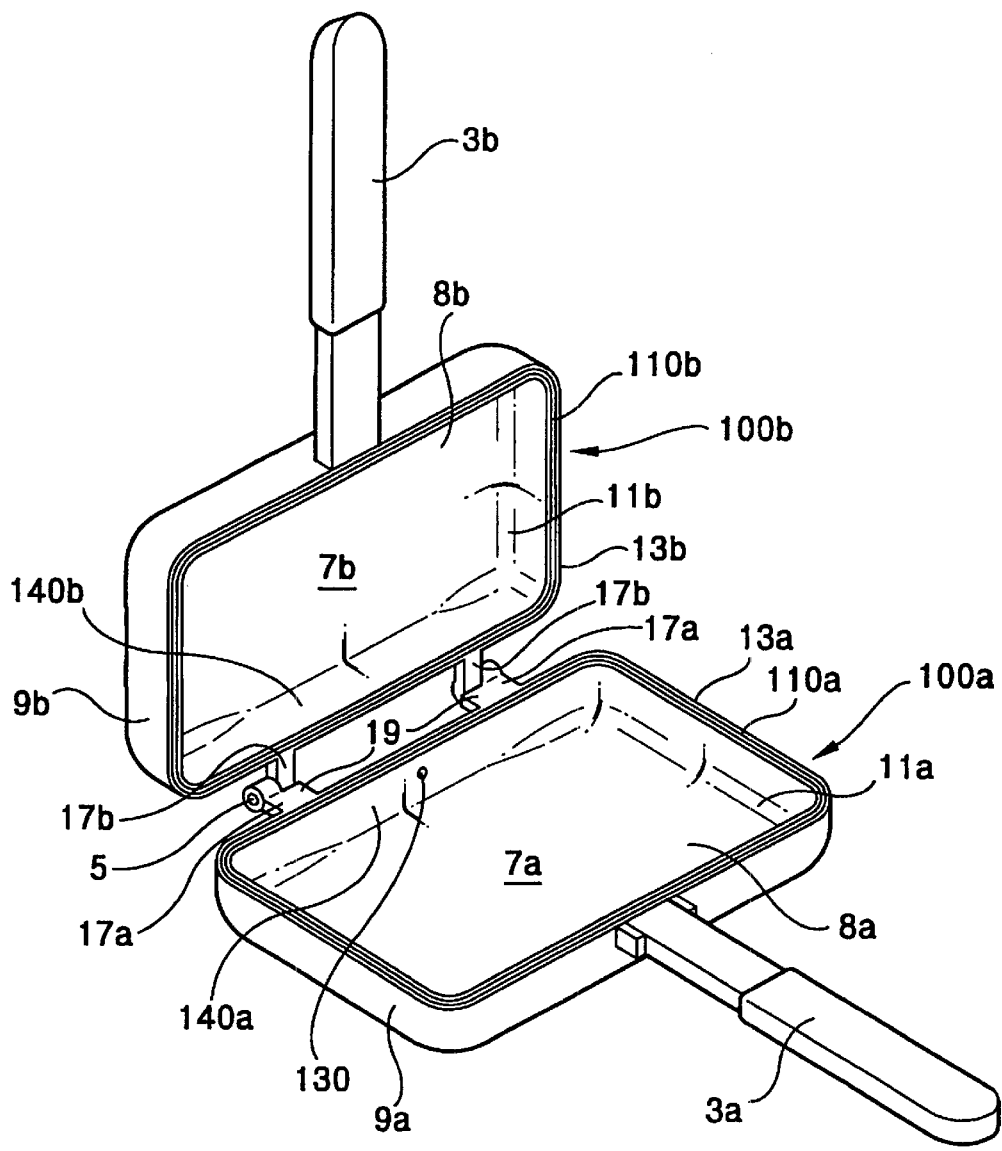
FIG. 3 is a perspective view showing a frying pan in an open state according to a first embodiment of the present invention.
Figure 4:
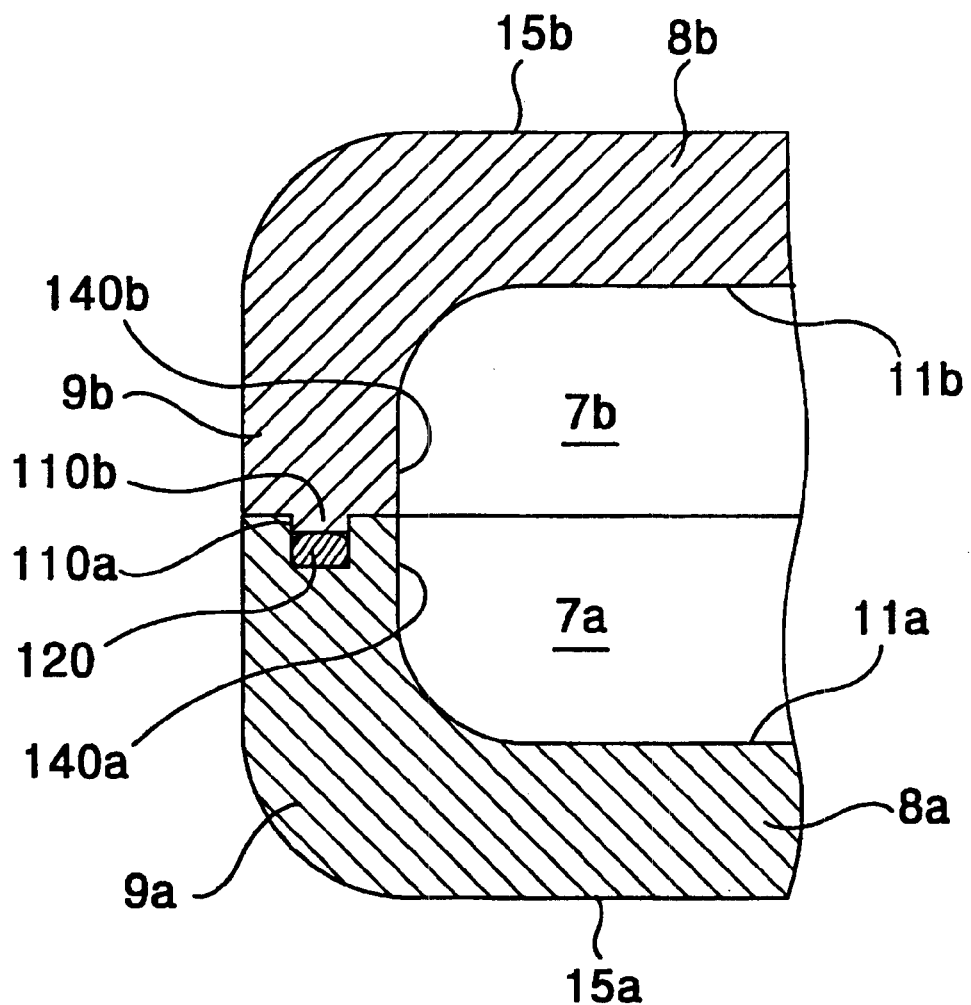
FIG. 4 is a section view showing the frying pan of FIG. 3 in a closed state.

FIG. 3 is a perspective view showing a frying pan in an open state according to a first embodiment of the present invention, and FIG. 4 is a section view of the frying pan of FIG. 3 in a closed state. As shown in FIGS. 3 and 4, the frying pan of the first embodiment includes, like the prior art, a first container 100a, a second container 100b, a pivot pin 5 for connecting the first container 100a and the second container 100b, and handles 3a, 3b installed to the first and second containers 100a, 100b, respectively.

In the above configuration, the first container 100a has a base 8a and a sidewall 9a perpendicularly connected to the base 8a, like the first container 1a of the prior art. Owing to such a structure, a first space 7a is formed in the first container 100a.

The second container 100b corresponding to the first container 100a includes a base 8b and a sidewall 9b perpendicularly connected to the base 8b to form a second space 7b in the second container At a contact surface 13a formed in the sidewall 9a of the first container 100a, a concave groove 110a is formed, and a packing 120 made of, such as, heat-resistant rubber or heat-resistant silicon is mounted at the concave groove 110a. At a contact surface 13b formed at the sidewall 9b of the second container 100b, a protruded rim 110b is formed to be fixed into and engaged with the concave groove 110a. Therefore, the frying pan of the first embodiment has a structure double-sealed by the packing 120, and the concave groove 110a and the protruded rim 110b.

A bottom surface 15a of the base 8a and a bottom surface 15b of the base 8b are also structured to be in contact with heat source so as to be used at once, as described in the prior art.

The pivot pin 5, like the frying pan of the prior art, is connected by hinges 17a, 17b formed at the first and second containers 100a, 100b respectively, in order to open and close the first container 100a or the second container 100b. At this time, a stopper 19 is preferably formed at the hinge 17a or 17b because the first and second container 100a, 100b may occupy too much space when being opened at 180°. Therefore, it is preferred that the first and second containers 100a, 100b are opened at 90° or little more.

On the other hand, a control unit 130 may be installed at the sidewall 9a or 9b of the first or second container 100a or 100b to control pressure and moisture in the container 100a, 100b as well as heat transmissibility. The control unit 130 may be installed by perforating a hole 130 at the sidewall 9a or 9b. The hole 130 is preferably formed at a sidewall (or rear wall) where the pivot pin 5 is mounted. If the hole 130 is formed at a sidewall (or a front wall) where the handle 3a or 3b is mounted, steam may leak through the hole so that a hand of a cook may be burnt. If the hole 130 is formed at a right or left sidewall, liquid may leak through the hole when turning over the first or second container 100a, 100b.

In addition, it is also preferred to form a liquid collecting portion 140a or 140b at a front edge of the first or second space 7a or 7b for collecting liquid, without making the edge round. In other words, the liquid collecting portion 140a or 140b may be a surface substantially perpendicular or inclined to the bottom surface of the first or second space 7a or 7b. Owing to the liquid collecting portion 140a or 140b, if the first or second container 100a or 100b maintains its opened state, liquid in the first or second space 7a or 7b may flow downward and collects in the liquid collecting portion 140a or 140b.

Other edges except the liquid collecting portion 140a or 140b of the first or second space 7a or 7b are formed to be a round portion 11a, like the above-described conventional frying pan.

Embodiment 2

The frying pan of the first embodiment may have a drawback that liquid may leak through the hole 130 when opening the first or second container 100a or 100b because the hole 130 is formed at the liquid collecting portion 140a or 140b. A frying pan designed to solve such a problem is shown in FIGS. 5 and 6.

Figure 5:
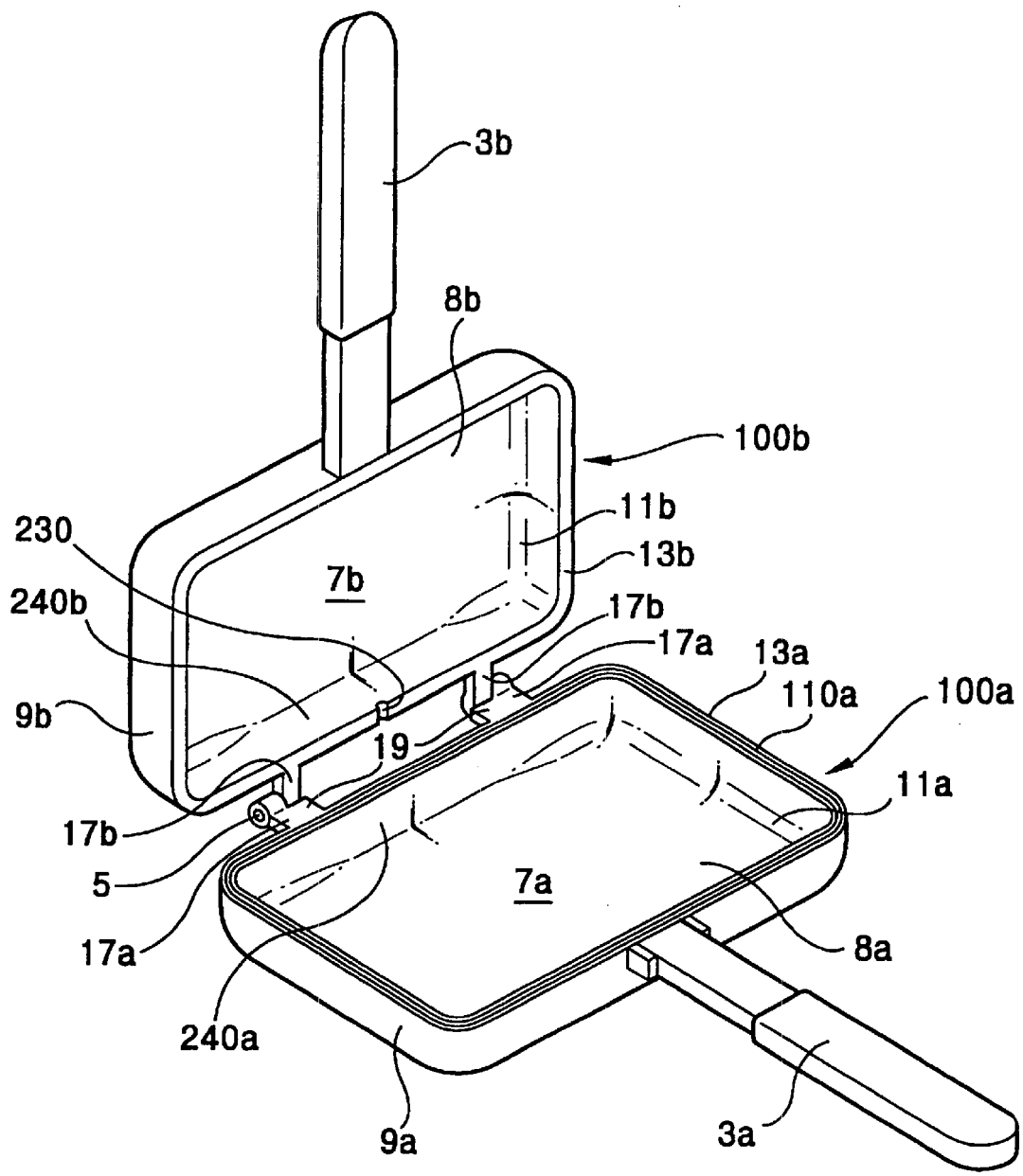
FIG. 5 is a perspective view showing a frying pan in an open state according to a second embodiment of the present invention.
Figure 6:
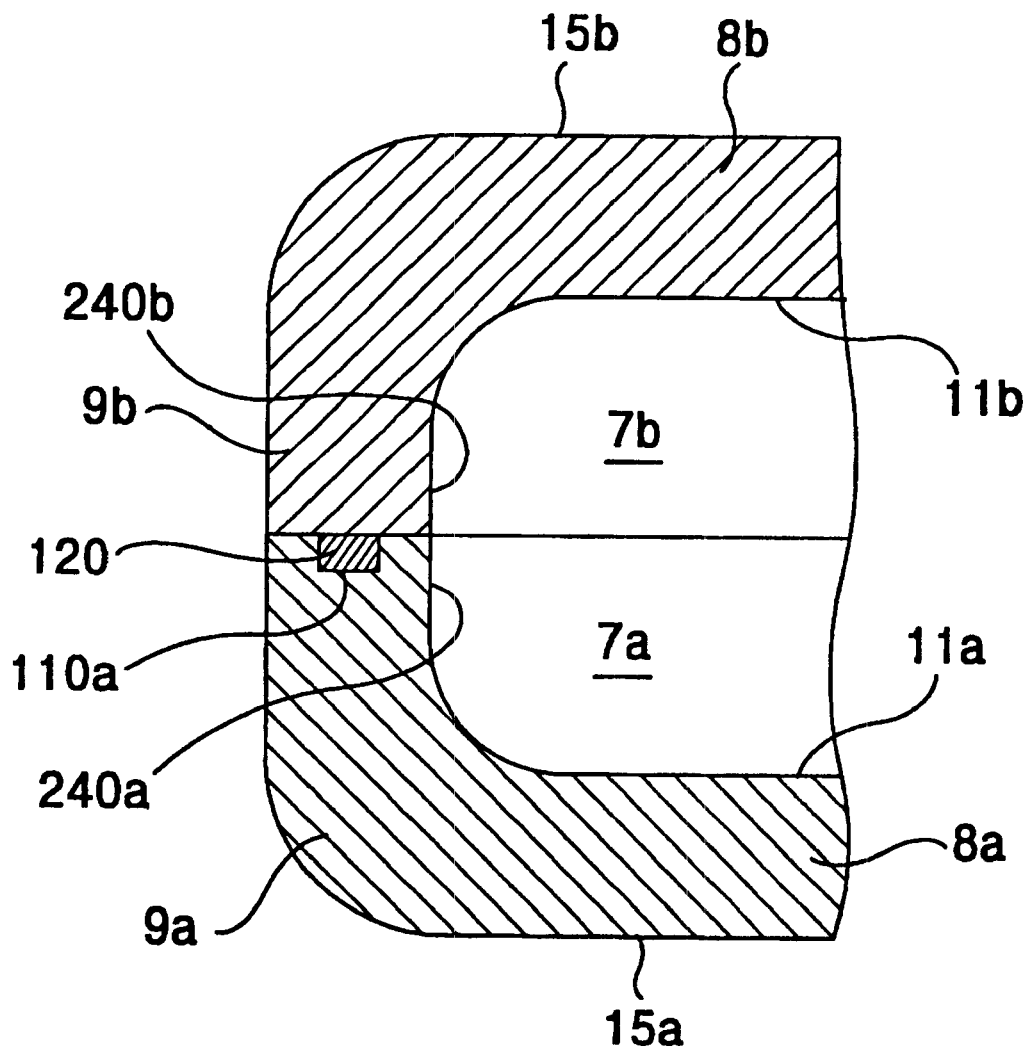
FIG. 6 is a section view showing the frying pan of FIG. 5 in a closed state.

FIG. 5 is a perspective view showing the frying pan in an open state according to the second embodiment of the present invention, and FIG. 6 is a section view showing the frying pan of FIG. 5 in a closed state. As shown in FIGS. 5 and 6, the frying pan of the second embodiment has similar configuration to the frying pan shown in FIGS. 3 and 4 excepting that a pressure and moisture controlling unit 230 is a groove 230 formed at the contact surface 13b and the protruded rim 110b is not formed at the contact surface 13b because the packing 120 is formed to extrude from the concave groove 110a when being inserted into the concave groove 110a so that the containers may be sealed by engagement between the packing 120 and the contact surface 13a.

Therefore, instead of forming the hole 130 at the liquid collecting portion 240a, the frying pan of the second embodiment has a structure that the groove 230 is formed at the contact surface 13b of the liquid collecting portion 240b.

Of course, the protruded rim 110b may also be formed at the contact surface 13b, like the first embodiment.

Embodiment 3

Though the hole 130 or the groove 230 is formed as a controlling unit in the first and second embodiment, a value for controlling pressure and moisture more accurately may be additionally mounted in the first or second container 100a or 100b. As the value, a relief valve (not shown) may be used for exhausting a part or all of heat or steam when an internal pressure of the container 100a, 100b reaches at a certain set value so as to maintain the internal pressure of the container 100a, 100b below the set value.

The frying pan is not limited to such examples but may be modified variously within the scope or spirit of the present invention allowed.

The frying pan of the present invention as described above has advantages as follows.

First, because the packing formed at the concave groove seals the first and second containers, heat in steam may be uniformly dispersed throughout meat in the containers, so improving heat transmissibility and therefore shortening time for cooking the meat.

Second, owing to double-sealing structure by the concave groove and the protruded rim, and the packing formed at the concave groove, the heat transmissibility is more improved to reduce time for cooking even more and saving energy.

Third, because the hole is formed at the first or second container to control pressure and moisture in the container, the internal pressure and moisture in the container may be suitably controlled without opening the containers. Therefore, the meat in the container may contain suitable moisture, so decreasing destruction of nutritious substances in the meat and maintaining the meat soft for a longer time.

Fourth, due to the liquid collecting portion formed at a rear wall of the first or second space, any liquid in the container does not fall down on the kitchen floor though the first or second container is opened.

Fifth, because the groove is formed at the contact surface as a pressure and moisture control means, leakage of liquid is retarded rather than the hole, so make the user more convenient.

Sixth, since the packing is formed at the concave groove to substantially protrude at the contact surface, the packing may be compressed more effectively thanks to engagement between the contact surface and the packing. Therefore, there is no need to use the protruded rim, so restraining cost increase.

The frying pan according to the present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A frying pan having first and second containers, which are combined to each other at one end and have a handle mounted at the other end, the frying pan comprising:

a concave groove formed on a contact surface between the first and second containers of any of the first and second containers;

a packing mounted in the concave groove; and means for controlling internal pressure and moisture in the first and second containers, the control means being mounted at any of the first and second containers, wherein the control means is a hole formed at a sidewall of any of the first and second containers.

2. The frying pan as claimed in claim 1,
   wherein a protruded rim is formed on a contact surface opposite to the contact surface where the concave groove is formed.

3. The frying pan as claimed in claim 1,
   wherein a liquid collecting, portion is formed on any of the first and second containers.

4. A frying pan having first and second containers, which are combined to each other at one end and have a handle mounted at the other end, the frying pan comprising:

a concave groove formed on a contact surface between the first and second containers of any of the first and second containers;

a packing mounted in the concave groove; and means for controlling internal pressure and moisture in the first and second containers, the control means being mounted at any of the first and second containers, wherein the control means is a groove formed on a contact surface opposite to the contact surface where the concave groove is formed.

5. The frying pan as claimed in claim 4,
   wherein a protruded rim is formed on a contact surface opposite to the contact surface where the concave groove is formed.

6. The frying pan as claimed in claim 4,
   wherein a liquid collecting portion is formed on any of the first and second containers.

* * * * *